United States Patent [19]

Reil et al.

[11] Patent Number: 5,201,163

[45] Date of Patent: Apr. 13, 1993

[54] METHOD OF MAKING A MOLDED PLASTIC PACKAGE

[75] Inventors: Wilhelm Reil, Bensheim; Ulrich Deutschbein, Muhltal; Gerd Knobloch, Griesheim; Udo Liebram, Pfungstadt, all of Fed. Rep. of Germany

[73] Assignee: Tetra Pak Holdings & Finance S.A., Pully, Fed. Rep. of Germany

[21] Appl. No.: 614,917

[22] Filed: Nov. 16, 1990

[30] Foreign Application Priority Data

Nov. 24, 1989 [DE] Fed. Rep. of Germany ....... 3938874

[51] Int. Cl.⁵ ............................................. B65B 47/00
[52] U.S. Cl. ........................................... 53/410; 53/453
[58] Field of Search ............... 156/272.2, 272.4, 275.1, 156/304.2, 304.6; 264/139, 248, 249, 510, 511, 524; 53/453, 559, 561, 574, 410; 222/129, 145; 426/106, 115, 108, 119, 392, 394

[56] References Cited

U.S. PATENT DOCUMENTS

| 2,343,734 | 3/1944 | Barber | 222/145 |
|---|---|---|---|
| 2,497,212 | 2/1950 | Donofrio | 264/4 |
| 2,527,919 | 10/1950 | Drangle | 426/120 |
| 2,661,870 | 12/1953 | Huenergardt | 222/129 |
| 2,934,867 | 5/1960 | Vogt | 53/453 |
| 2,958,168 | 11/1960 | Vogt | 53/453 |
| 3,118,041 | 1/1964 | Young | 156/272.2 |
| 3,172,927 | 3/1965 | Mojonnier | 425/388 |
| 3,197,071 | 7/1965 | Kuster | 222/145 |
| 3,347,699 | 7/1969 | Kinney et al. | 53/329.4 |
| 3,512,332 | 5/1970 | Klein | 425/387.1 |
| 3,605,374 | 9/1971 | Mueller et al. | 53/453 |
| 3,695,799 | 10/1972 | Held, Jr. | 425/388 |
| 4,216,046 | 8/1980 | Hackert | 156/274.4 |
| 4,375,146 | 3/1983 | Chung | 53/453 |
| 4,704,844 | 11/1987 | Mancini | 53/453 |
| 4,907,394 | 3/1990 | Tshepke et al. | 53/453 |
| 4,967,539 | 11/1990 | Hansen | 53/453 |
| 4,994,638 | 2/1991 | Iorns et al. | 426/241 |

FOREIGN PATENT DOCUMENTS

| 0032257 | 7/1981 | European Pat. Off. | 53/453 |
|---|---|---|---|
| 0077756 | 4/1983 | European Pat. Off. | |
| 0343266 | 11/1989 | European Pat. Off. | |
| 1055802 | 4/1959 | Fed. Rep. of Germany . | |
| 1511800 | 7/1969 | Fed. Rep. of Germany . | |
| 2346039 | 3/1974 | Fed. Rep. of Germany . | |
| 2908397 | 9/1980 | Fed. Rep. of Germany . | |
| 3643030 | 6/1988 | Fed. Rep. of Germany . | |
| 567812 | 10/1957 | Italy | 53/559 |

Primary Examiner—Jay H. Woo
Assistant Examiner—Robert B. Davis
Attorney, Agent, or Firm—Paul & Paul

[57] ABSTRACT

A method of producing a package for fluids made of a synthetic plastic material, in which a strip of the material is shaped to form two rows of tub-shaped containers which are filled, sealed, pairs of them being folded together to form a single container, and welded closed into a single container.

In a particular preferred embodiment, two plastic webs are first brought together continuously and sealed along outer edges, to form a tube, with the tube then being filled from above, with thereafter transverse seals provided between pairs of adjoining tub-shaped containers.

7 Claims, 8 Drawing Sheets

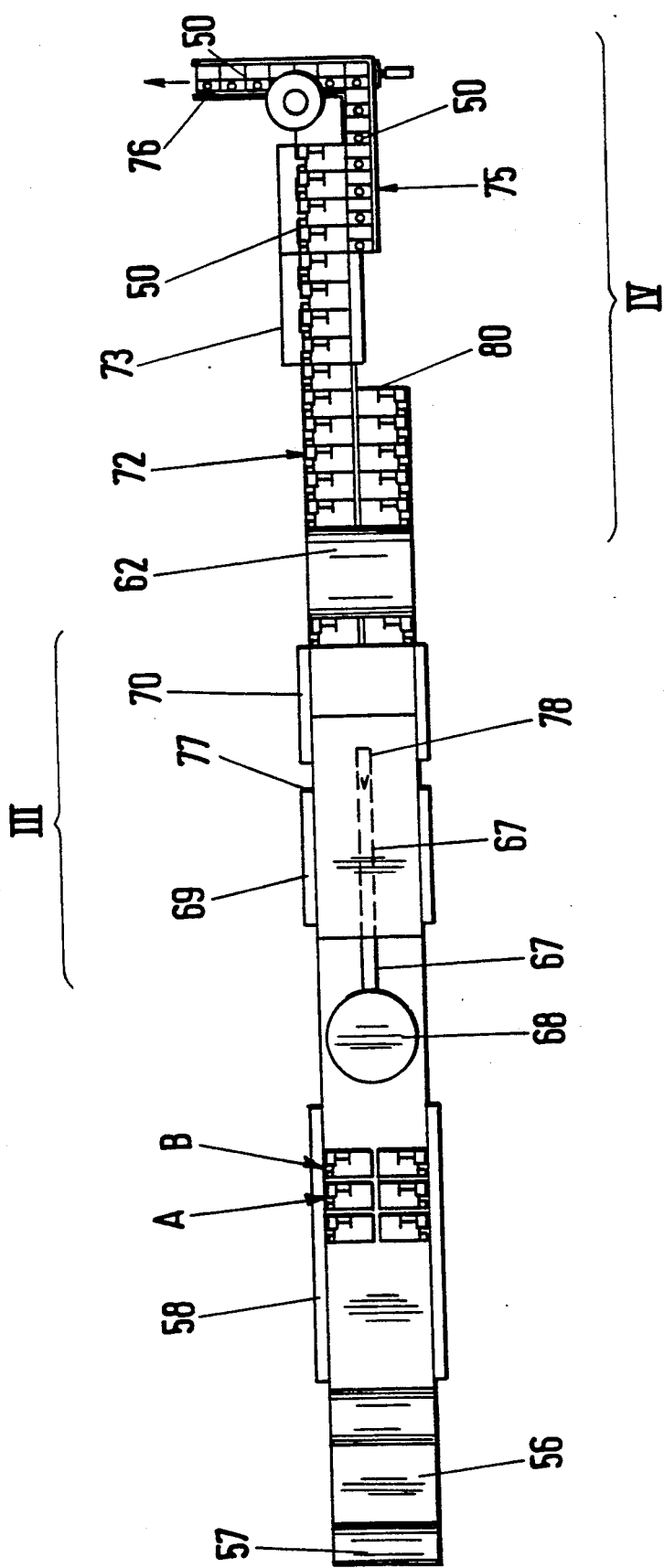

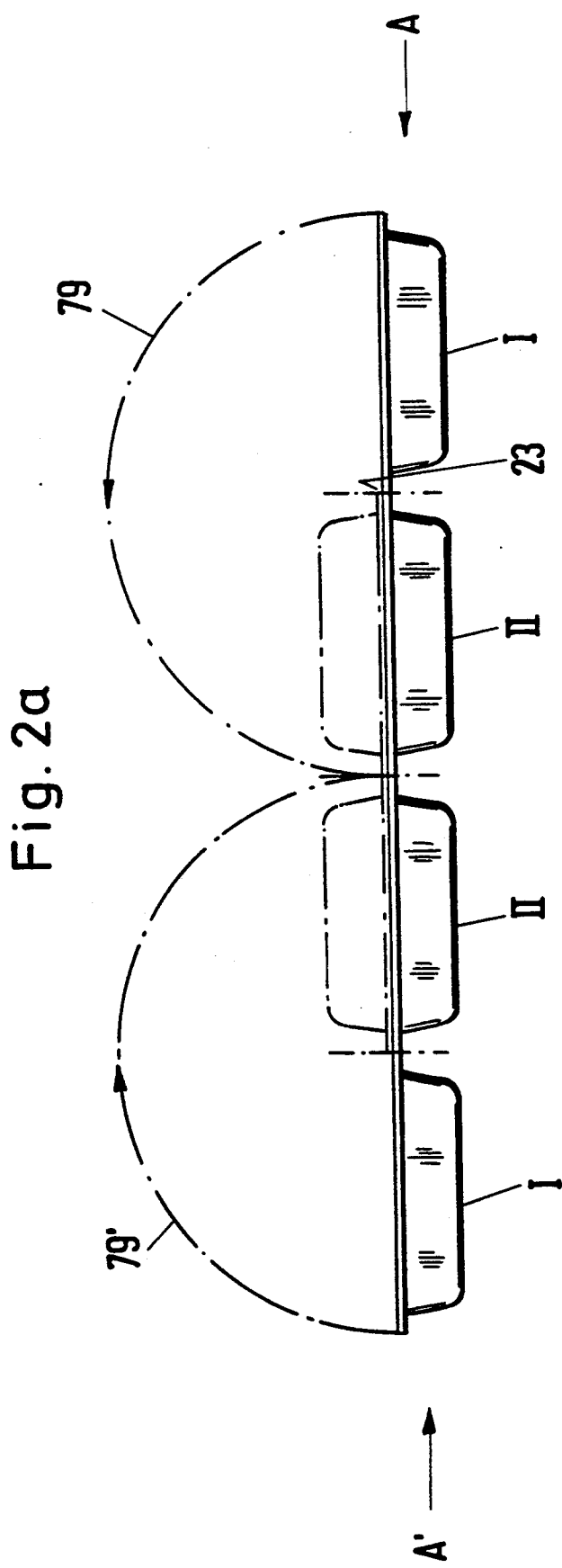

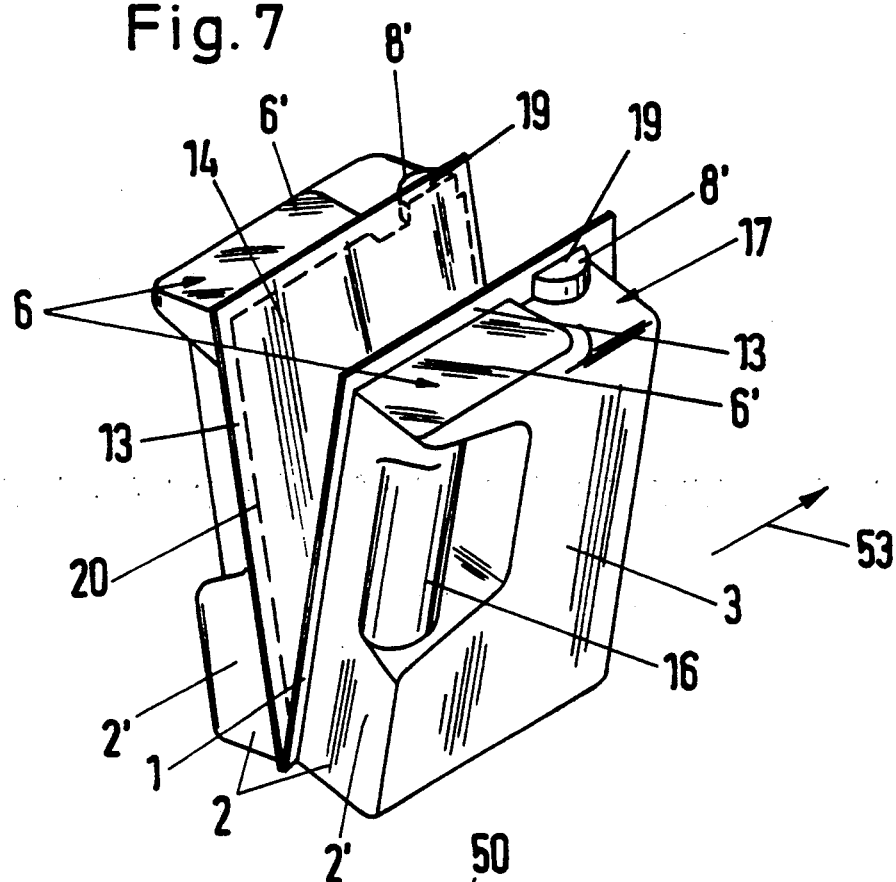
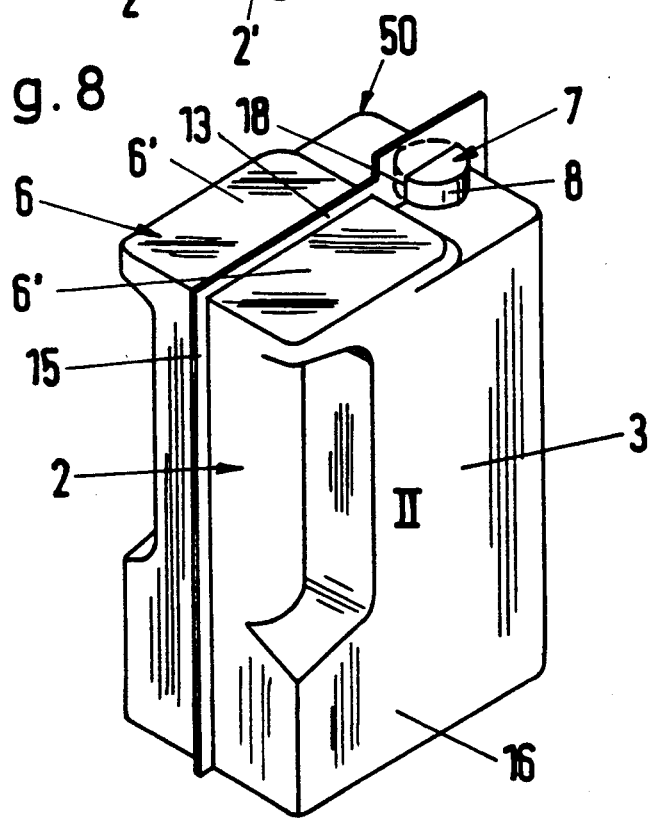

METHOD OF MAKING A MOLDED PLASTIC PACKAGE

The invention relates to a method of manufacturing from synthetic plastics material a package filled with flowable contents and in which a web of deformable synthetic plastics material is pulled from a roll and is shaped to form at least one row of tub-shaped containers after which the relevant container is filled, sealed, singled out and carried away. Furthermore, the invention relates to an apparatus for producing from synthetic plastics material a package filled with flowable contents, with a roll supplying a strip of deformable synthetic plastics material, an arrangement for shaping the strip into at least one row of tub-shaped containers with deflecting rollers and drive rollers for the at least one row of tub-shaped containers with filling means and feeding means for a further synthetic plastics sheet and sealing means and with a removal conveyor. The invention also relates to the use as a material for the strip of containers a synthetic plastics material which is suitable for deep drawing.

FIELD AND GENERAL DESCRIPTION OF THE INVENTION

A large number of containers to hold liquids are to be found commercially, milk and juices mainly being transported in liquids packages, the side walls of which consist of synthetic plastics coated paper. Here a distinction is drawn between packages the bottom of which likewise consists of this material, the top possibly consisting of synthetic plastics material with no carrier material and there are also packages in which both the bottom and also the top may consist of purely synthetic plastics materials. Fatty products, particularly oils, are already packed in synthetic plastics packages with no carrier material, all manner of synthetic plastics moulding processes being used to produce such packages which consist entirely of plastics materials.

On grounds of costs, manufacturers have in the past refrained from marketing packages for liquid foodstuffs such as for example milk and juices in containers which consist entirely of synthetic plastics material. Not only the synthetic plastics material as such is expensive compared with paper but also the machines used for manufacturing and filling packages have in the past been uneconomically expensive for purely synthetic plastics packages.

The invention is based then on the problem of providing a method of producing a fluids package which consists of synthetic plastics material and an apparatus for carrying out such a method, so that mass production becomes possible with a machine of high output, the steps in the procedure being such that packages to contain flowable media can be produced in large quantities with as few and as simple as possible machining and production stages, the use of suitable materials and their configuration resulting in a competitively priced product.

With regard to the method, this problem is according to the invention resolved in that in each case at least one pair of containers which are adjacently disposed in the direction of conveyance are so formed that at the outer edges which are on the outside in the direction of conveyance in each case one pair of the open-topped containers and between in each case two consecutive pairs of containers which succeed each other in the direction of conveyance there is formed transversely to the direction of conveyance a rim which projects outwardly like a flange and in that in the region of the outer edge of each container of the relevant pair there is forming a partial cavity of the pourer device, a depression which is so integrally moulded that the rim encircles the outside of the depression, the flange-like rim being disposed substantially in one plane, extending around the openings of the containers and in that from a second roll, a synthetic plastics sheet is pulled off and sealed longitudinally in the direction of conveyance onto the rim lengthwise of the relevant outer edge, outwardly sealing the at least one row of adjacently attached pairs of containers, the at least one resultant tube being filled with the material to be packaged, the synthetic plastics sheet being connected to the rim by transverse sealing between the (in the direction of conveyance consecutive) pairs of containers, the strip being so cut and handled that the containers of in each case one pair are brought together sheet on sheet and are welded to each other to form a package.

When studying this solution to the aforesaid problem in accordance with the invention, it must be borne in mind that at least one row of containers is being formed from a strip and that, as distinct from the containers, a package is formed from each pair of containers. Therefore, two containers belong to any one package which is produced in accordance with the invention. For example, both containers can be substantially the same size so that the package can be imagined as being divided into two halves, each half of the package being constituted by one container.

It is known per se to form from a strip of deep drawable synthetic plastics material a row of containers one after the other in the direction of conveyance and to fill these and to seal them with a second strip of synthetic plastics material, this said second strip being sealed onto the rims surrounding the container apertures, which lie in one plane. With such machines it is however only possible to produce tub-shaped containers which are filled and sealed in one horizontally extending treatment path and the plane upper apertures of which are occluded by the second web of synthetic plastics material lengthwise of one plane. It is true that liquids can be filled into such packages and transported but for the end user it is virtually impossible to utilise these packages. In fact, with tub- or shell-shaped containers, opening is a matter of pulling off the web of synthetic plastics material which seals the container, by tearing it upwards from one corner so that after the first tearing-open process, the aperture is very large and liquids cannot be poured out under control. Therefore, more solid contents or at least pasty materials are packed in such packages.

Using the method according to the invention, it is possible indeed to package pasty contents, but preferably and with no difficulty it is also possible to package readily viscous fluids, e.g. including milk and juices.

The invention takes the surprising step of sealing tub-shaped containers and then, in the region of the film which is doing the sealing, of bringing pairs of containers into contact with each other so that they lie film on film, whereupon they are connected securely. At the same time, a pourer device which is expedient for fluids is provided in that in a specific portion of the edge a part of the flange-like rim is shaped into a depression the interior of which communicates with the interior of the container. According to the invention, the rim along which the synthetic plastics film is subsequently sealed on in fluid-tight fashion encircles the depression so that the sealing seam extends outside the depression. Thus the invention overcomes doubts concerning whether each container in the pair can be fluid-tightly closed in itself, in fact sealed, and that opening could only be performed with difficulty. In actual fact, though, the depressions are so disposed in the flange-like rim that when the two containers in a pair are brought together film on film then also the depressions are aligned one with another. Each depression forms a partial cavity of the pourer device so that after the two containers in a pair have been brought together also the two depressions form the cavity of the pourer device.

Surprisingly, connecting two sealed containers in the manner according to the invention actually provides a synthetic plastics package in which even liquids can be transported and conveniently handled by the end user.

So that it is easy for the end user to pour in a practical fashion, in a further development of the method according to the invention, it is envisaged that when the containers of each pair are brought together, the depressions come to rest on one another and complement one another to form the total cavity of the pourer device and in that both the rim encircling the outside of the depression and also a part of the surface of the depression are removed to form the pourer orifice. If one imagines the form of a depression to be that of a half-cylinder, one end face of the cylinder being closed and disposed alongside the flange-like rim, then the other end face has to be connected to the interior of the container. If, then, the containers of each pair are brought together then in the example of a semi-cylindrical depression, the two depressions in the flange-like edges of the two containers supplement each other to produce a pourer device of cylindrical shape, i.e. the end user recognises a pourer spout in the form of a short tube. The furthermore advantageous removal also of a part of the area of the depression during the manufacturing process serves to open the container in the region of the pourer device once this has of course gained the correct position, generally after it has been brought into an upper position. For better and clear illustration, one can imagine a block-shaped container with the bottom end downwards and the pourer device at the top. Ideally, the topmost partial area of the pourer device will be removed in accordance with the teaching according to the invention. The end user then finds a filled package which is only open at the upper end of the pourer. It will be understood that this can then be closed in fluid-tight manner by means of a cap and an appropriate sealing ring and can then even open it in a manner such that it can be closed again. It is in this way that a package with flowable contents can be inexpensively and quickly manufactured, filled and sealed, the bringing together of the two containers film on film forming a composite package with a composite pourer device which can expediently be opened entirely at the top even during the manufacturing process.

Any hesitation on the part of persons skilled in the art concerning the manufacture of packages to hold fluids to the effect that the synthetic plastics film could interfere with the pouring process, are inaccurate, as the invention has already demonstrated in practice. It is also obvious that for example after unscrewing a sealing-tight cap from the pourer device a flowable substance can be poured out of every part of the package, the contents flowing out along the synthetic plastics film in the region of the pourer device. There is no need to fear and nor has anyone observed any hindrance to the emerging contents due to the synthetic plastics film which, in the case of a package which is divided into halves, passes through the centre of the pourer device.

According to the invention, it is furthermore expedient if the containers of each pair are brought together in hinging fashion and are connected to each other by being folded over about a common inner edge which extends in the direction of conveyance. Indeed, each container could be provided with its own encircling flange-like outwardly projecting rim and the two containers could then be brought together film on film. Both the steps in the procedure and also the apparatus for carrying out such a method can however be simplified considerably if in the region of one pair of containers there is a common inner edge between the two containers of one pair which connects the two to each other like a hinge. This does not mean that the material has to be subjected to a continual loading caused by the stress of a bending movement. It is rather more the case that there is one single twisting or turning movement, one container being so folded hinge-wise about the common inner edge through preferably 180° that film comes to rest on film, the depressions of the two containers which are brought together in this manner supplementing each other to produce the joint pourer device. This common inner edge has the advantage that the positioning of the folded-over container or of both the containers which are subjected to the folding-over movement can be adjusted one in relation to the other without the need for any complicated means of controlling the machine being provided in the region of the turnover station.

This turning over or folding over, in the case of the method according to the invention, takes place particularly advantageously when after the synthetic plastics film has been sealed on tightly all round the edges of the relevant pair of containers, in each case two (in the direction of conveyance) consecutive containers are separated from one another by a preparatory cut extending from the outer edge to the common inner edge. The words preparatory cut means that the cutting process takes place in various stages, with provision for a preparatory cut and at least one secondary cut. Actually, it is practical for in each case one container of each pair of containers to remain in its position while the other container which is connected hinge-wise to the first container via the joint inner edge, is turned or folded over about this edge because this is not only the simplest and quickest method but because also this type of machining allows the machine to be simplified to the greatest possible extent.

If one imagines that, looking in the direction of conveyance of the strip, then one sees at least two rows of containers moving in the direction of conveyance because the containers are moved pair-wise in their direction of conveyance. If, then, from a row of containers running one after another in the direction of conveyance, one takes any two containers, then these are separated from each other by carrying out the aforedescribed preparatory cut. In this respect, it will of course be understood that each container in a pair has to be cut through at its (in the direction of conveyance) front and also rear edges (the latter extending transversely to the direction of conveyance), so that these individual containers can be folded over hinge-wise along their joint inner edge. This method which is suggested in accordance with the invention does not of course exclude the possibility of the containers being folded over about their common inner edge onto the other container of the relevant pair in groups of two, three, four or more. In other words, it is possible both to fold over the individual containers by separating it from the rest of the strip by two of the afore-described preparatory cuts, but it is however also possible for two containers which run one behind in the direction of conveyance to be separated from the strip as a group by the appropriate preparatory cuts after which they may possibly even be separated from each other and folded over; however, these groups can also be assembled into a relatively large number of packages. The apparatus to be described hereinafter shows that it is expedient for four containers to be grouped together and for this group to be folded over about the inner edge as one composite unit.

Attention is furthermore drawn to the fact that it is by no means necessary for each container to be perfectly fluid-tightly sealed in respect of the other container in a pair. In fact, this is not possible if the common inner edge of a pair of containers is relatively narrow if not actually sharp. Actually, in the case of the afore-described tube-like part, the longitudinal seal is effected around the filler tube and outside the level of the liquid along the outer edges which extend in the direction of conveyance. The transverse seal is then made along the flange-like edges which are disposed between consecutive pairs, in other words it extends transversely to the direction of conveyance. Neither the longitudinal nor the transverse seal is made along the inner common edge between two containers of one pair. This means that in the case of thinly fluid contents, these would be optionally distributed throughout the entire package when one container is turned over in respect of the other in a pair, following the laws of gravity. This is neither disadvantageous nor does it interfere with the production or use of the package according to the invention.

To the extent to which the production method according to the invention has been described, prior to final removal conveyance, each package is still attached to its neighbour, forming a delivery string. This is desirable because in a production machine it is easier to handle a delivery string than it is to handle individual packages. This is particularly favourable if further operations have to be performed on accurately positioned packages. Then, intervention can be more accurately performed, i.e. tool and workpiece can be brought together accurately. Therefore, mention is made of a "preliminary cut" in which firstly one half of the pair of containers is cut off and separated either individually or in groups. This separation must also be understood only in the region of this row of containers which are serially disposed in the direction of conveyance and which have to be folded over or which are already folded over, because they remain connected by the common inner edge to the still cohesive string of the other row of containers in the relevant pairs of containers. This of course brings the advantage of simpler positioning so that a partial pourer device of one container can be accurately positioned on the other partial pourer device of the other container.

Many machining processes can be better described if in addition a distinction is made between the flange-like rim of the relevant container on the one hand and the web of synthetic plastics film which lies on the rim of the container and only in the region of the rim. It is true that the web does belong to the synthetic plastics film, but if one speaks of a synthetic plastics web, then the reader immediately understands that only the strip-like edges of the synthetic plastics film are involved, which lie web-like on the relevant container rim to which they are connected by welding.

According to the invention, it is furthermore envisaged that upon formation of the package, the containers are welded to one another along the superposed edges with the synthetic plastics web sealed onto them. This is of course subject to the fact that firstly the synthetic plastics web is sealed or welded onto the rim of the relevant container and subsequently, after the two containers of a pair have been brought together, the rims of the containers are to be welded to one another, it being understood that the synthetic plastics webs are jointly welded in between them. To be more precise, in the region of the container rim, firstly the synthetic plastics web is welded to a synthetic plastics web and with a supply of sufficient heat, then, also the rim of one container is welded to that of the other so that the two containers actually behave as one piece, forming a joint package, i.e. they form an integral package.

According to the invention, it is particularly advantageous if the superposed edges of both containers are additionally and form-lockingly connected to one another by continuously extending holes, tabs or hooks. For forming the integral package, it has in fact been found expedient if not only the welding force keeps the two containers together along their edges but if the two containers act like an integral component and thus act as a joint package and show themselves to be forming a form-locking connection between the two edges of the two containers of one pair. For example after the containers have been superimposed in their marginal zone, simple tools can so pass through both edges together with the synthetic plastics webs that the material of the rim on one container comes to rest on and engages over the rim of the other container by passing through an aperture, in the manner of a hook, the simultaneous application of heat guaranteeing a fixing of these hooks or holes. Thus, the two containers are anchored rigidly to each other along the three rims and the fourth rim is the common inner edge along which for instance the bottom of the container likewise provides an anchorage point. The end user has the sensation of the package composed of the two containers actually being a one-piece and integral product.

According to the invention, it is furthermore suitable for the packages to be singled out during or after the container rims have been joined to one another. The advantages of better positioning tools in respect of the workpiece if the workpieces are still connected to one another like a string has already been mentioned. If the packages are singled out from one another only after their rims have been joined to one another, then at least up to this stage of connecting the container rims, the string being properly positioned as it is passed through the machine. It has been found to be particularly advantageous that the singling out should take place only after the container rims have been connected to one another, namely by such a stage of processing where all the operations have been substantially performed. Afterwards, accurate positioning of tool to workpiece is no longer required.

With a further advantageous development of the invention, upon removal of the rim of the relevant container in the region of the depression and also part of its surface area, in order to form the pourer orifice, the superposed edges of the depressions are sealed on one another to form the pourer cavity and more or less at the same time, the edges of the containers are welded together to form the package. These measures represent a particularly good configuration of the pourer device. At the same time as the container rims are joined to one another, there is provision for a construction of the pourer device, namely the sealing of the edges of the depressions on one another. This operation can be carried out simultaneously with the stamping away of the rim (plus the synthetic plastics web) in the region of the relevant depression: and it can even be achieved by motional welding, if in fact a rapidly rotating tool removes the topmost part of the depression, because with such a tool it is also possible to seal the edges of the depression. The part of the depression which is removed during this operation is expediently the disc or the two partial discs which are at the top of the finished package and which later will form the pourer orifice of the package. Preferably, these discs are stamped away to form the pourer orifice. This stamping operation takes place simultaneously with the stamping away of the rim surrounding the depression, as far as the root of the depression, i.e. as far as the inner end of the pourer spout, where this latter is fixed to the top wall of the package.

It is expedient to provide a partial screw-thread on the relevant underside of the depression when one is looking down onto the orifice of the container from above, so that after the depressions have been assembled together and the pourer device formed, there is formed on the outside of the pourer a screw-thread on which it is possible to screw a sealing and closing cap.

With regard to the apparatus, the problem is according to the invention resolved in that between a driving roller and a deflecting roller on a first conveyor strand incorporating a vertical component and intended for the at least one row of containers there is a filler tube which extends parallel with this strand, a longitudinal sealing means enclosing the filler tube and a transverse sealing means disposed after the filler tube in the direction of conveyance.

Flowable contents can be filled by means of a tube. Where packages consisting of paper are being produced, it is known by longitudinal sealing to form a paper tube into which a filler pipe is inserted and to produce individual package units by transverse sealing. With a leaning towards this general idea but in this case overcoming difficulties by using completely differently orientated partial treatments of a package which is to be formed, it is true that here only one filler tube is used but where the production apparatus is concerned, here for the first time a first transport section is provided which has at least one vertical component so that in other words there is a "top" and a "bottom", so that the flowable contents can flow downwardly through the tube. Therefore, the filler tube can be situated vertically but also at an angle of inclination to the vertical and it has been found to be particularly advantageous for this first conveyor run and for the filler tube which is disposed parallel therewith to be disposed at an angle of about 45° to the vertical. This longitudinal sealing arrangement does according to the invention surround the filler tube so that the upper level of flowable contents in the region of this first conveyor run is in any event sealed outwardly in a fluid-tight fashion. In this way, it is possible to form a tube, one "wall" of the tube being the strip with the row of tub-shaped containers while the other wall is the strip-form synthetic plastics film which is to be laid on it. When these two parts are welded to each other, one can speak of a tube and this tube is then filled with contents by means of the filler tube. On the downstream side of the filler tube there is the transverse sealing arrangement so that after the entire line has passed through in the direction of conveyance behind the transverse sealing arrangement of each pair of containers and thus each package is already filled and sealed in a fluid-tight manner.

It is advantageous furthermore if according to the invention, above a second conveyor strand and after the transverse sealing means in the direction of conveyance, there is a pre-cutting station with a turning apparatus, an edge-welding means and a singling-out station. Whereas the first conveyor strand can be disposed in an oblique position, the second conveyor strand can be laid in a horizontal plane because the production machine can be more easily constructed in this way, especially with the preliminary cut, turning and other welding equipment.

For shaping of the strip, it is expedient to use a deep drawing apparatus, according to the invention.

In a further advantageous development of the invention, for producing the fluids package, it is possible to use as a material for the strip of deformable synthetic plastics material a synthetic plastic material which can be deep drawn, preferably a thermoplast and in particular polypropylene. It is furthermore expedient if the material for the strip consists of a deformable synthetic plastics material which is filled up to about 60%, the filler used preferably being chalk, mica, talcum or gypsum. It has also been found to be very expedient for the material for the container to have a thickness of 0.7 to 1.2 mm and preferably 0.8 to 1.0 mm and for the thickness of the synthetic plastics film to be about 5% up to 15% and preferably about 10% of the thickness of the container.

By virtue of the above-described method and the apparatus according to the invention, a package for fluid medium comprising simple procedural media and apparatus parts is provided particularly since in the production of fluids packages, heavy duty machines are of interest. In other words, a method is provided in which the container can be rapidly filled and sealed. If it were desired, without using the thin synthetic plastics film, to weld the containers themselves, i.e. the rims of the containers to one another, then a high heat output would need to be applied in order to weld the one flange-like rim of thick synthetic plastics material to the other which consists of the same material. On the other hand, according to the invention, an intermediate stage has surprisingly been chosen in which in fact only a very thin synthetic plastics film has to be sealed onto a thick edge, the man skilled in the art seeing immediately what time-related and procedural advantages accrue from welding a thin film onto a thick film compared with welding together two thick rings.

In the case of another embodiment, it might be conceivable for the two containers, after they have been folded together to form the integral package, to be joined to each other purely by mechanical shaping without—apart from the opening area—any special welding operations. It is however expedient if in addition to the mechanical shaping operations for joining the rims of the containers to one another, also heat could be used at least to such a degree that the machine output is not reduced. For example, it would be sufficient for the two synthetic plastics webs, after the containers or the parts of the package have been turned over, to be fixed to each other by adhesion, by the application of moderate heat and high pressure, and otherwise to achieve a form-locking connection between the synthetic plastics rims by mechanical means. For these connection and welding operations, just as much time could be expended as is necessary to provide stamping and welding operations in the region of the pourer device. These measures would have the advantage that the output from the machine could be kept high while the package consisting of two parts could nevertheless be combined in the manner described above.

In the case of a further development of the invention, it is particularly expedient if the two adjacent walls under the common inner edge of one pair of containers so diverge over their complete area or at least over parts of the areas, V-wise, so that the tip of the V is disposed in the region of the inner edge, the two wall panels diverging from each other on the opposite side. These two wall panels can be so constructed or the pourer device can be so disposed that the two partial wall panels in question subsequently form the bottom of the completed package. After the two containers have been brought together by relative rotation of the two about the inner edge, the two adjacent wall panels come to be substantially one plane, i.e. the bottom part of the package is formed. This bottom may also have notch-like depressions, so achieving the same advantage as with the V-wise divergence of the bottom wall parts: namely the strong construction of the deep drawing tool in the region of the inner edge of a pair of containers. Thus, the apparatus becomes robust.

The synthetic plastics film affords a further major advantage for the completed package, because it does in fact stiffen the entire package in the same way as the spokes of a bicycle. Since each container advantageously, acquires for itself the tractive forces of the synthetic plastics film, the completed package, since of course it consists of two such containers, is especially stiffened, the result being that the synthetic plastics walls needed to produce the tub-shaped containers can be thinner. This in turn means that the manufacturing process can be simpler.

SUMMARY OF INVENTION

The present invention is directed toward providing a method of making a filled package by first applying heat and relative pressure to draw a sheet of plastic into a plurality of container halves, filling the container halves and bringing another sheet of plastic into contact with edges of the first sheet and sealing them together, and then folding the container halves together and welding them closed.

Further advantages, features and possible applications of the present invention will emerge from the ensuing description of preferred examples of embodiment, in conjunction with the drawings, in which:

BRIEF DESCRIPTION OF DRAWINGS FIGURES

FIG. 1 is a diagrammatic side view of the package manufacturing apparatus from the roll carrying the supply of deformable synthetic plastics strip as far as the removal conveyor with the completed packages;

FIG. 2 diagrammatically shows a plan view of the apparatus in FIG. 1;

FIG. 2a diagrammatically shows a cross-sectional view through FIG. 3 taken on the line IIa—IIa in FIG. 3;

FIGS. 4 to 7 are perspective views of intermediate stations in the package production process;

FIG. 8 is a perspective view of the completed package prior to treatment of the pourer device;

Figure 9:
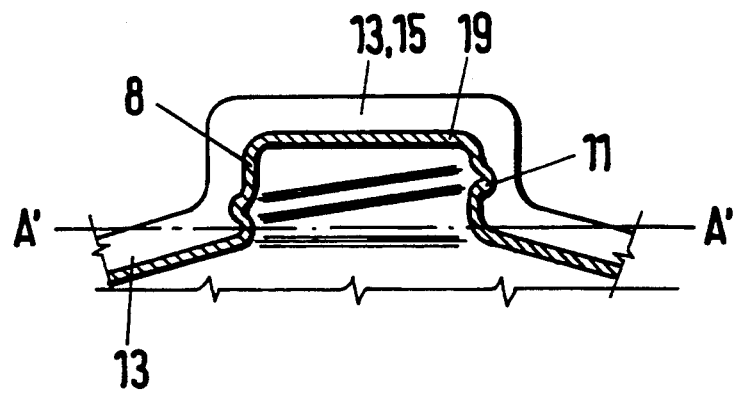
Figure 10:
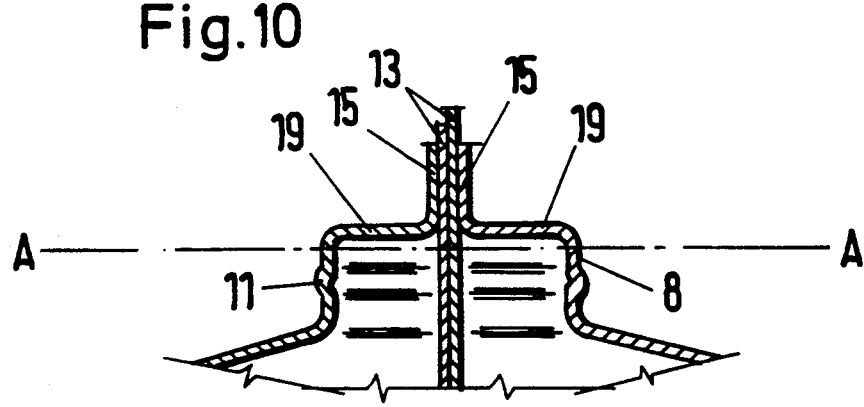
Figure 11:
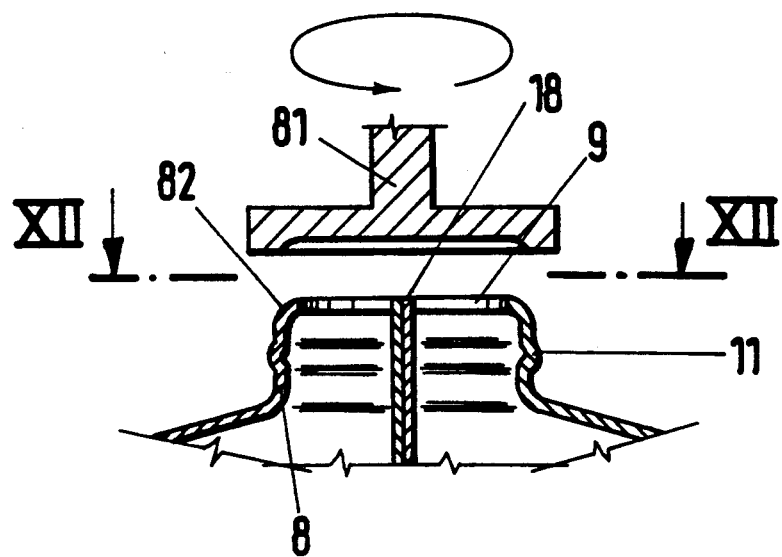
Figure 12:
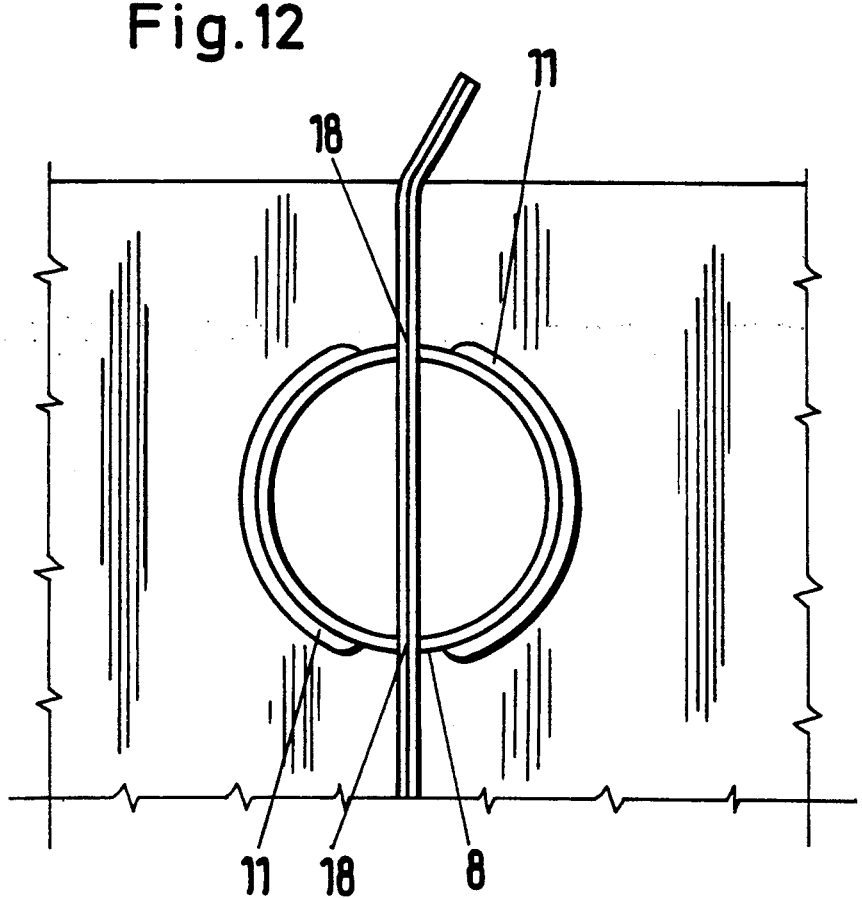
Figure 13:
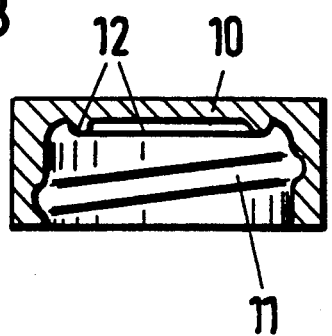

FIG. 9 diagrammatically shows a sectional view at right-angles to the depression and with the flange-like rim surrounding it;

FIG. 10 is a sectional view crosswise to that in FIG. 9, FIG. 10 showing however both the welded-on synthetic plastics films;

FIG. 11 is a rotary welding tool after it has been applied to the completed pourer device;

FIG. 12 is a plan view of the package in the region of the pourer device taken on the line XII—XII in FIG. 11 and FIG. 13 is a cross-sectional view of a closure cap.

DETAILED DESCRIPTION OF THE PREFERRED EMBODIMENTS

For better understanding of the manufacturing method and the apparatus for applying this method, it is appropriate to describe firstly the product, i.e. the containers and the way they are brought together to form the package, with reference to FIGS. 4 to 8.

The package 50 which is shown substantially complete in FIG. 8 (except for the pourer device 7) comprises, disposed underneath and alongside this pourer device 7, the front narrow side wall 1 which is composed of the two front half side wall parts 1'; the rear narrow side wall 2 which is composed of the rear half side wall parts 2', a large side wall 3 and opposite it a large side wall 4, the bottom 5 which is composed of the two half bottom parts 5' and the top wall 6. The top wall is likewise composed of two half top wall parts 6'.

The pourer device 7 consists essentially of a cylindrical rim 8 forming a depression which is freely connected to the interior of the package and which has on the outside, as shown in FIG. 11, a pourer orifice 9 which, after filling and complete or partial emptying, is closed by means of the cap 10 shown in FIG. 13 which can be fastened for instance by means of a screw-thread 11. It is true that FIG. 13 shows this screw-thread 11 as an internal screw-thread but in FIGS. 9 to 12, the external screw-thread projecting from the surface of the cylindrical rim 8 is designated 11. The plan view in FIG. 12 furthermore shows that in a preferred embodiment the screw-thread 11 can also be constructed in two parts.

According to the illustration in FIG. 13, at the top, the cap 10 has an annular gasket 12 by means of which this closure cap 10 is capable of fluid-tightly sealing the pourer orifice 9.

Figure 5:
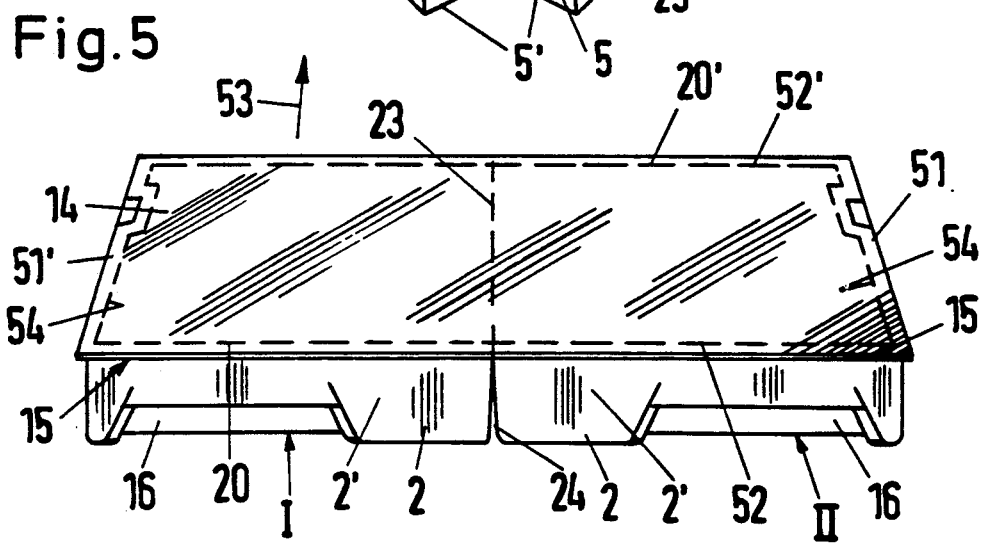

The entire package 50 is composed of two tub-like containers, namely the left-hand container I shown for example in FIG. 5 and the right-hand container II, the two containers having substantially the same volume so that for example a 2 liter package 50 to hold liquid may consist of two containers I and II each of which has a capacity of 1 liter of liquid. Any other size and volume is conceivable.

Figure 4:
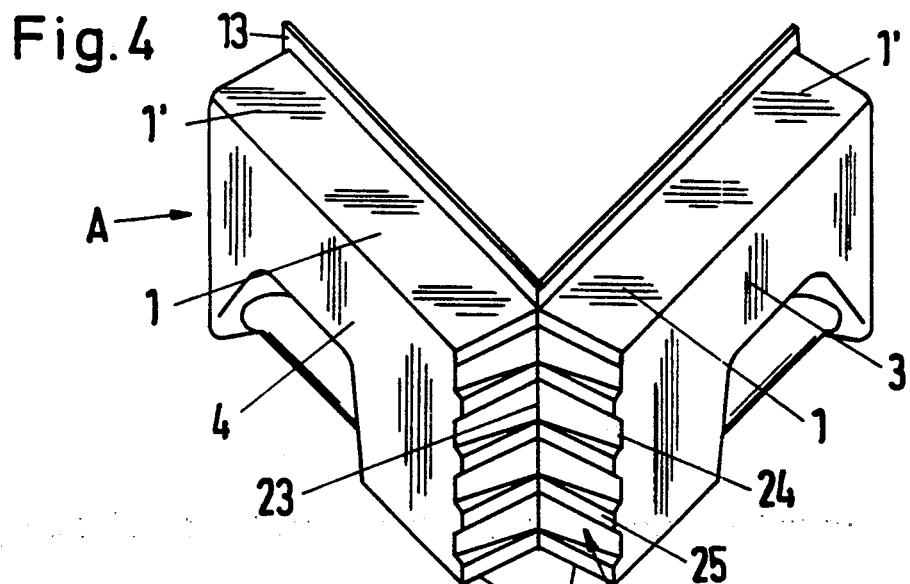

The package shown in a perspective view here is, from FIG. 4 onwards, shown with ascending numbering from that state on where the synthetic plastics film 14 is sealed onto the containers I and II along the seam 51, 51', 52, 52'.

It will be evident that the relevant pair A of containers I and II disposed one beside the other in the direction of conveyance 53 is provided with a flange-like outwardly projecting outer rim 13 on the outer edges 54 which are on the outside in the direction of conveyance 53. However, this rim 13 extends also transversely to the direction of travel 53, namely between two (in this direction of conveyance 53) consecutive pairs A and B of containers I and II. This flange-like rim 13 therefore consists at least of the same wall thickness or thickness of material as the side walls 3 or 4.

The synthetic plastics film 14 is welded onto this rim 13 along a closed seam 51, 52, 51', 52'. In this respect, the seams 51 and 51' extend in the direction of conveyance 53 parallel alongside the outer edges 54 of each pair of containers A, B and continue in the direction crosswise to the direction of conveyance 53 into the seams 52, 52'. The synthetic plastics film 14 thus lies flat on the rim 13 of each container I, II so that in the region of the rim 13 of the container I, II, the synthetic plastics film 14 takes the form of an encircling web 15. When looking down on the left-hand rear part of the still V-wise open package, as shown in FIG. 7, this synthetic plastics web 15 can be seen and it can also be seen in the view in FIG. 5, while in the illustrations in FIGS. 4, 6, 8 and on the front right-hand part of the half-package in FIG. 7 the flange-like rim 13 of the stronger synthetic plastics material of the relevant container I, II can be seen.

By virtue of the sealing seam 51, 52, 51', 52', the relevant container I or II is sealed, in fact welded, in a fluid-tight manner. The synthetic plastics film 14 which is for example thinner by one order of magnitude can be very readily sealed onto the thicker flange-like rim 13 of the container I or II. Therefore, the rim 13 is bonded to the web 15 of the synthetic plastics film 14.

Figure 6:
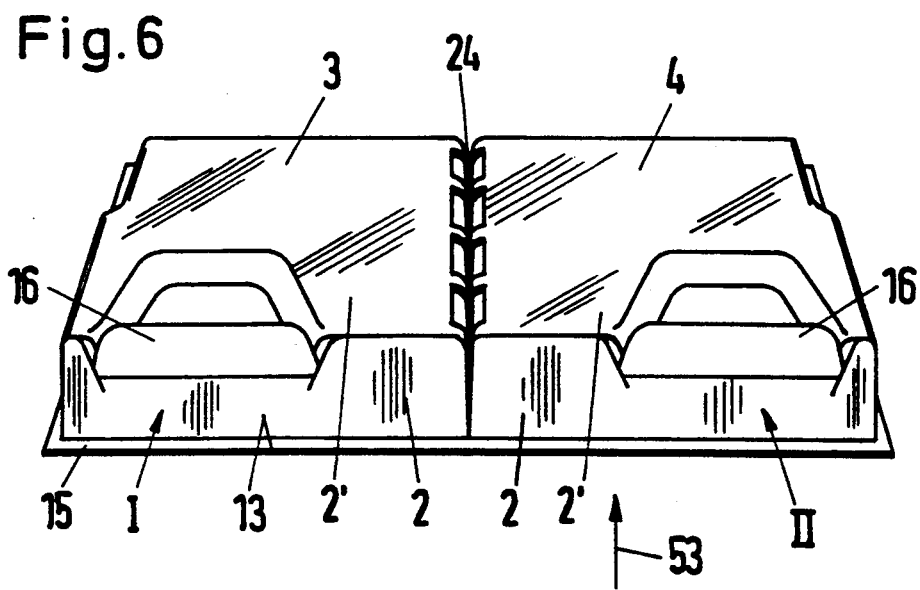

Initially, the pair of containers A comprising containers I and II are disposed flat, e.g. horizontally beside each other in the view in FIGS. 6 and 5, while in FIG. 4 the process of folding them over about a common inner edge 23 is commencing, is being continued in FIG. 7 and is completed in FIG. 8.

In the situation shown in FIG. 8, the rims or edges 13 and the synthetic plastics webs 15 are doubled in their juxtaposed condition. It will be evident how the side wall 2 is formed by the wall parts 2' and the top wall 6 is formed by the top wall parts 6' and so on.

Each container I, II comprises a gripper recess 16 in the oppositely disposed large side walls 3, 4. Furthermore, FIGS. 7 and 8 show that the pourer device 7 is disposed as a depression in an upper wall recess 17 so that in the completed package, substantially according to FIG. 8, the pourer device 7 does not project beyond the outer contours, i.e. does not project beyond the outer surface of the top wall 6.

In order to make up from the two containers, i.e. the package halves, one integral package having substantially the shape shown in FIG. 8, the cylindrical edge 8 must be welded and in this as well as in FIGS. 11 and 12, there is shown a seam 18 where the two synthetic plastics edges are connected to each other by welding. The total cylindrical edge 8 which is composed of the depressions 8' (FIG. 7) constitutes so to speak the above-mentioned pourer through which the contents can be poured out once the closure cap 10 has been unscrewed.

In FIG. 7, in the region of the pourer orifice, a part of the half-ring is shown by broken lines behind the synthetic plastics film 14, and each of the depressions 8' or semi-circular parts is occluded by a semi-circular panel 19. FIG. 7 also shows as a broken line the outer edge 54 which is in the direction of conveyance 53 (also shown in FIG. 5) which continues in the edge 20, 20' of the container I, II of the relevant pair A, B.

FIG. 4 shows how the two containers I and II are folded over hinge-like about the inner edge 23 of the bottom 5. Were the situation in FIG. 8 reached, then the two bottom parts 5' would constitute the flat bottom 5 on which the package can stand. This bottom 5 is not completely flat but has notch-like depressions or recesses 25 extending from the middle edge 23 of the bottom 5 outwardly and downwardly to the relevant end edge 24.

Figure 1:
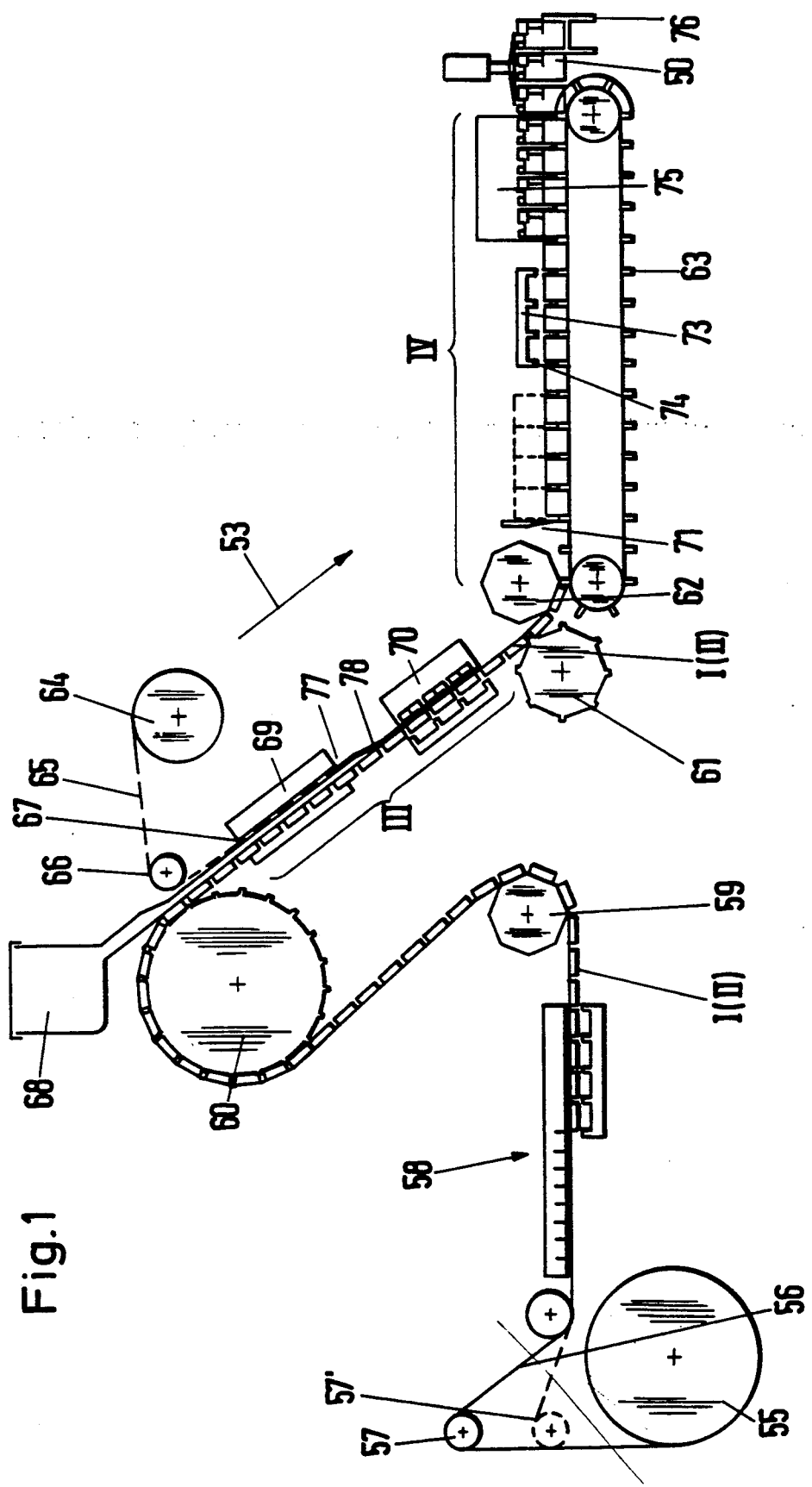

FIG. 1 shows a first roll 55 from which a first strip 56 of chalk, mica, talcum or gypsum filled synthetic plastics material having a thickness of about 1 mm is pulled off over a movable deflecting roller 57 (57') and conveyed into a deep drawing apparatus only shown generally as 58. Here, a row X, Y of tub-shaped containers I, II are formed under heat. Passing over a further deflecting roller 59, the row X, Y of pairs of containers A, B are pulled obliquely upwardly around a drive roller 60 where this string of containers I, II is deflected substantially through 180° and transferred to a first conveyor strand III. This conveyor strand has a vertical and a horizontal component so that in the direction of conveyance 53 it extends obliquely downwardly at an angle of for instance 60° to the vertical. At the top is the start of the first conveyor strand III and at the bottom the string of containers I, II passes over driving and/or deflecting rollers 61, 62 into a second conveyor strand IV which is disposed substantially horizontally. In it, onwards conveyance takes place over an endless conveyor belt 63.

From a second supply roll 64 is drawn the strip of synthetic plastics film 65 which is passed over a deflecting roller 66 and introduced at the upper commencement end of the first conveyor strand III.

Between the strip-like synthetic plastics film 65 and the string of open-topped containers I, II in the region of the obliquely inclined first conveyor strand III there is a likewise parallel and therefore obliquely inclined filler pipe 67 beneath a diagrammatically indicated filling container 68 containing the flowable material with which the containers are to be filled.

In the upper region of the first conveyor strand III there is likewise an obliquely disposed longitudinal sealing means 69 and on the downstream side and at a distance therefrom there is a transverse sealing means 70.

In the region of the second conveyor strand IV, in the direction of conveyance 53, there is initially a preliminary cutting station 71 with a turning-over device 72 and at a distance after this there is a marginal welding device 73 which is preferably also combined with a singling-out station 74. At the downstream end of this second conveyor strand IV there is a station 75 for righting the completed packages 50 which are transported on by a removal conveyor 76 to be packaged or the like.

With the knowledge of the product and the foregoing description of the manufacturing apparatus, the method can now be briefly and understandably described. From the supply roll 55, the 1 mm thick strip of 60% filled synthetic plastics material is pulled off and is shaped in the deep drawing apparatus 58 to form containers I and II. These are connected in pairs A, B, and naturally any desired number of pairs of containers A, B, C, D, etc. can be continuously drawn in one string over the deflecting roller 59 and over the driving roller 60.

In the region of the first conveyor strand III, the string of containers I, II initially starts moving parallel with the obliquely downwardly extending filler pipe 67 while on the side opposite the container string, in respect of the filler pipe 67, the synthetic plastics film 65 is likewise moved strip-wise in the direction of conveyance 53. In the region of the likewise obliquely disposed longitudinal sealing device 69, the seam 51, 51' is applied alongside the outer edge 54 of the containers I, II so that the web 13 of synthetic plastics film 14 is sealed onto the outside rim 15 in such a way as to produce a tube. Understandably, this exists when looking from the downstream end 77 of the longitudinal sealing means 69 onwards in the direction of conveyance 53. Therefore, the outlet 78 of the filler pipe 67 is disposed at the start of the tube, the level of liquid contents possibly being in this region.

Figure 3:
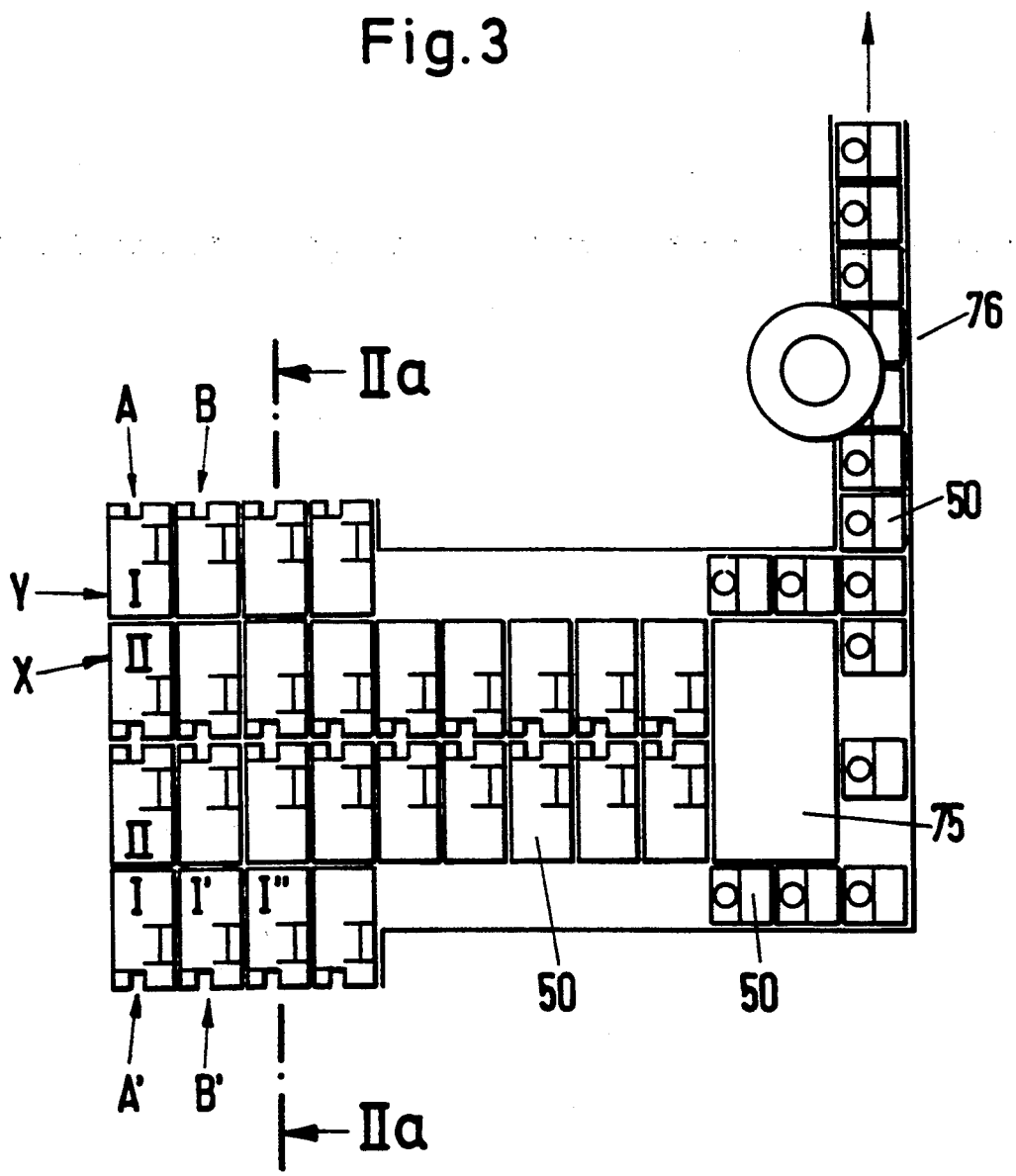
FIG. 3 is a plan view of the end part of the manufacturing apparatus of a production machine modified in respect of the apparatus shown in FIG. 2 and having two production lines and thus double the output.

Upon further passage through the manufacturing apparatus in the direction of conveyance 53, this now filled tube passes into the transverse sealing device 70 where the sealing seams 52, 52' are made and which are connected to the outer sealing seams 51, 51' which extend in the direction of conveyance 53 in such a sealing-tight fashion that the encircling sealing-tight seam 51, 52, 51', 52' is formed. Now closed on all sides, the containers I, II pass out of the first conveyor strand III into the second conveyor strand IV. With the preliminary cutting means 71, for example as shown in FIG. 3, the preliminary or preparatory cut is made in the region of the row Y from the top downwardly as far as the common central edge 23 between the two containers I and II.

As shown diagrammatically in FIG. 2a, it is thus possible for the containers I to be folded over hinge-wise about the inner edge 23 as indicated by the dash-dotted arrow 79 so that they then lie in the position shown by dash-dotted lines in FIG. 2a, film on film, each container being juxtaposed with the other container of a pair A, B, etc. This state is indicated by the stage 80 in FIG. 2. On the left, the pairs of containers are still beside one another and are still open and on the right-hand side of the stage 80, they are brought together so that the film 14 is superimposed on the film 14.

The next stage is welding of the rims or edges 15, 13 of the two containers I, II to each other in the marginal welding apparatus 73 and the containers are also singled out here in the singling-out station 74.

The now completed package arrives at the pourer sealing and turning over apparatus 75 in which the package is not only brought from the horizontal to the upright position but in which there is also an operation which is best illustrated with reference to FIGS. 9 to 11.

According to FIG. 9, the rim 13, 15 is now stamped away along the line A'—A', the two semi-circular panel parts 19 being cut away at the same time. This can be more clearly seen from the sectional view in FIG. 10. Finally, a rapidly rotating punch 81 bends over the cylindrical depressions 8 along the edges 82 and at the same time the already described welding of the depression or cylindrical edges takes place as shown at 18 in FIGS. 11 and 12.

Not shown is a further arrangement for screwing prefabricated caps 10 onto the opened pourer device 7 for final closure of the filled package 50. This then arrives at the removal conveyor 76 and is carried away to a packing station or the like.

FIG. 3 shows, like the right-hand side of FIG. 2, the downstream end of the second conveyor strand IV but in contrast to FIG. 2, it is for a machine for twice the output, in which not only two rows X and Y of pairs A, B of containers I, II are produced and transported in the direction of conveyance, but in which there are adjacently disposed two pairs, the pair A' being produced and processed at the same time as and alongside the pair A. FIG. 2a also shows how upon folding over about the common essential edge 23, both pairs A, A' can be processed jointly.

We claim:

1. A method of manufacturing a package filled with flowable contents from a pair of complementally configured synthetic plastic containers, including the steps of
   (1) continuously advancing a first web of synthetic plastics material of a first thickness,
   (2) applying heat and relative pressure to form at regular intervals along said web, a pair of complementally configured open tub-shaped containers, said containers being formed with an outwardly extending peripheral rim along the open edge thereof, and said containers being formed with a common adjoining edge,
   (3) continuously advancing a second, separate web of plastics material of a second thickness parallel with and in the direction of advance of the first web of plastics material, with the second web being thinner than the first web,
   (4) filling said tub-shaped containers with flowable contents,
   (5) bringing the first and second webs into overlying contact with each other so that the second web covers the open containers and their rims are then sealed by welding the second web of plastics material to the first web of plastics material along the peripheral rim of the pair of open containers,
   (6) cutting said second web of plastics material and the containers sealed thereto transversely to its direction of advance and within said regular intervals sufficiently to allow folding of the pair of sealed containers,
   (7) folding the pair of sealed complementally configured containers so as to bring the portions of the second web of plastics material which seal the containers into abutting juxtaposition, as well as bringing the peripheral rims of each contiainer of the pair into matching alignment,
   (8) welding the abutting plastics material in the area of the peripheral rims of the tub-shaped containers, thereby forming a package filled with flowable contents.

2. A method according to claim 1, wherein the application of heat and relative pressure form adjacent the peripheral rim of each container, a half-cylindrical depression, which depressions upon folding of the containers form a total pourer device for the package, forming a pourer orifice by removing contiguous portions of the peripheral rim and occluding portions of the half-cylindrical depressions.

3. A method according to one of claims 1 or 2, wherein the peripheral rims of each container are additionally lockingly connected to one another by locking means.

4. A method according to one of claims 1 or 2, wherein the packages are separated during or after the step of welding the plastics material in the area of the peripheral rims.

5. A method according to claim 2, wherein the depressions which form a total pourer device are sealed onto one another substantially at the same time as the welding of the abutting plastics material in the area of the peripheral rims.

6. The method of claim 1, wherein the direction of advance is a longitudinal direction; wherein the first and second webs are first sealed together longitudinally to form a tub, wherein the tub thus formed is filled from above, followed by the step of providing a transverse seal between each pair of two adjoining tub-shaped containers.

7. The method of any one of claims 1 and 6, wherein the direction of advance is a longitudinal direction; wherein the sealing of the open containers includes separate longitudinal sealing and transverse sealing steps; with the longitudinal sealing step being along opposite longitudinal outer edges of adjacent attached pairs of containers, and with the transverse sealing step comprising transversely sealing transverse edges of a pair of open containers.

* * * * *